United States Patent [19]
Sugimura

[11] 3,770,018
[45] Nov. 6, 1973

[54] VALVE ASSEMBLY WITH LINEAR MOTORS

[76] Inventor: Nobuyuki Sugimura, 1416 Sodeshi-cho, Shimizu, Japan

[22] Filed: Sept. 13, 1971

[21] Appl. No.: 179,640

[52] U.S. Cl.............................. 137/625.42, 251/141
[51] Int. Cl............................................ F16k 11/07
[58] Field of Search.................. 137/625.42, 625.4, 137/625.48, 625.47; 251/141

[56] References Cited
UNITED STATES PATENTS

| | | | |
|---|---|---|---|
| 2,916,019 | 12/1959 | Murphy | 137/625.48 X |
| 3,587,156 | 6/1971 | Sorenson | 137/625.48 X |
| 3,470,908 | 10/1969 | Austin | 137/625.4 |
| 2,925,985 | 2/1960 | MacDavid | 137/625.48 X |
| 2,822,824 | 2/1958 | Glower et al. | 137/625.42 |
| 3,191,626 | 6/1965 | Leibfritz | 137/625.48 X |
| 3,435,851 | 4/1969 | Olmstead | 137/625.48 |
| 3,570,516 | 3/1971 | Mason | 137/625.48 X |

*Primary Examiner*—Samuel Scott
*Attorney*—Samuel Meerkreebs

[57] ABSTRACT

A valve having liquid inlet and outlet ports; liquid flowing through the outlet port being controlled by a spool valve element moved by linear motors; one of the enlarged portions of the spool valve element being shaped as a cone to control liquid flow; an electrical current controller for voltage or frequency operatively connected to a stator of the respective linear motors; and an operation rod provided in the linear motor, the diameter of the operation rod being varied to vary the speed of the spool through variation of magnet forces.

8 Claims, 5 Drawing Figures

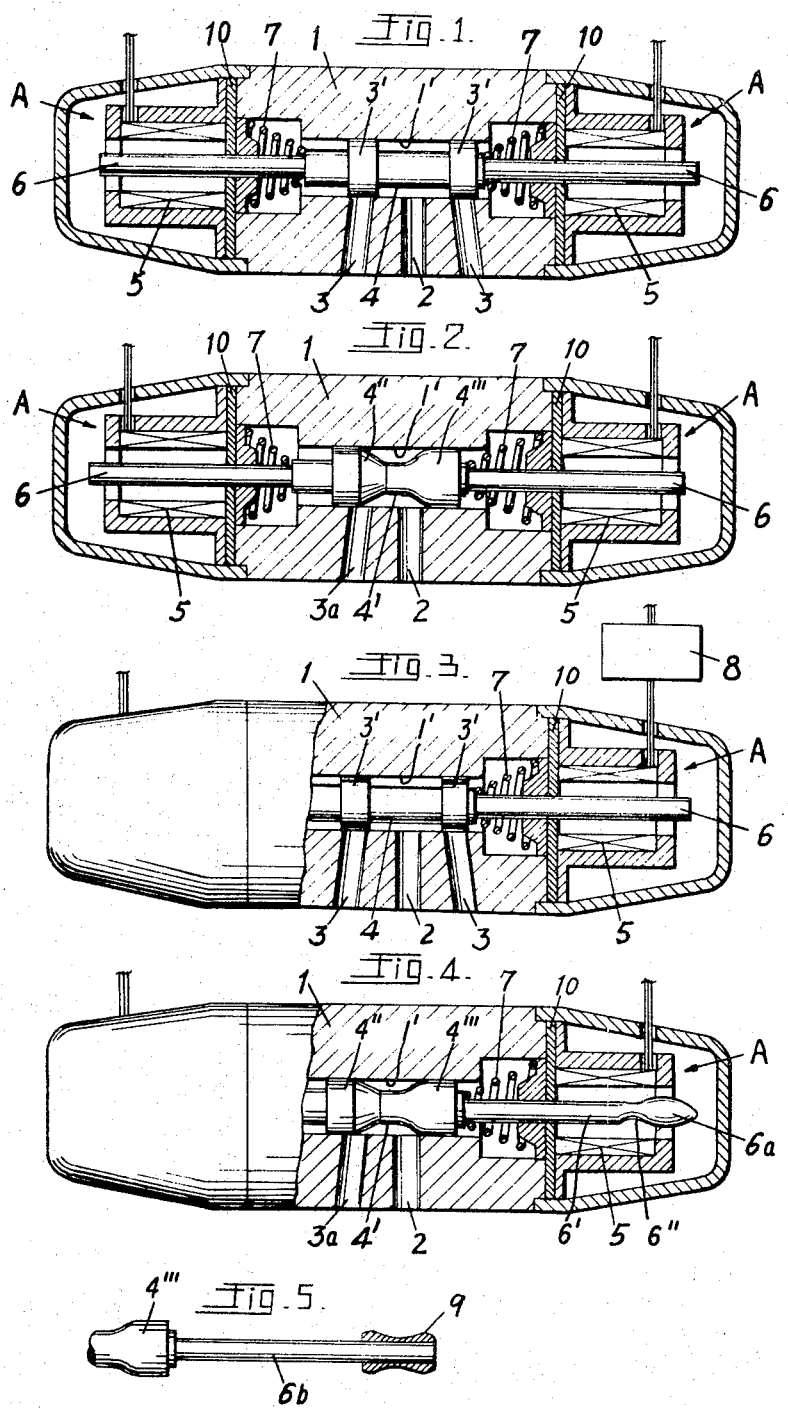

VALVE ASSEMBLY WITH LINEAR MOTORS

BRIEF SUMMARY OF THE INVENTION

This invention relates to a hydraulic control valve with linear motors to control liquid flow in a hydraulic system, and more particularly relates to a valve operable with linear motors in which each motor has an operation rod moved by a shifting magnet field whereby the rod moves a spool controlling liquid flow through inlet and outlet ports of the valve.

SUMMARY OF THE INVENTION

The object of the present invention is to provide an improved valve with linear motors in which a reciprocating spool valve is reciprocated through liquid control positions relative to inlet and outlet ports for controlling liquid flow, and the operating stroke of the spool can be increased to facilitate manufacture of large sized electromagnetic valves.

Another object of the present invention is to provide the improved electromagnetic valve with a spool having one enlarged end portion shaped as a cone to afford a variable cross sectional area in relation to a flowing passage and finite control of liquid flow through the valve.

A further object of the present invention is to provide in the improved valve a stator for each linear motor connected to a variable current controller operatively connected to an operating rod designed with a varied diameter to provide variable magnetic sensibility and variations in the linear speed of spool valve.

A still further object of the present invention is to provide in the improved valve a current control for the stator to vary the movement of the valve spool thus automatically controlling liquid flow in response to the position of the valve.

These together with other objects and advantages will become apparent from a consideration of the following description of preferred embodiments, shown by way of example, and the accompanying drawings forming a part of the description, wherein:

BRIEF DESCRIPTION OF THE DRAWING

FIG. 1 is a longitudinal cross sectional view of a valve with linear motors;

FIG. 2 is a longitudinal cross section, similar to FIG. 1, showing a second embodiment of the present invention in which a valve has a different shaped spool;

FIG. 3 is a cross sectional view of a valve similar to that shown in FIG. 1 to which a variable current control is connected to the stator of a linear motor;

FIG. 4 is a cross sectional view of a valve like that shown in FIG. 2, including an operating rod having varied diameter; and FIG. 5 is a longitudinal section view of an operating modified rod per se of the character used in the embodiment of the present invention.

DESCRIPTION OF THE PREFERRED EMBODIMENT

The construction of a valve of the present invention is such that the valve case has a central axial through bore, linear motors are disposed at opposite ends of the valve case, each linear motor has a stator for producing shifting magnet field and an operation rod provided inside the stator and movable by the shifting magnet field; the operation rod being connected to a control spool for controlling liquid flow through an outlet port or ports.

In FIG. 1, a valve body or casing 1 has a liquid inlet port 2 and flanking outlet ports 3,3. A spool valve 4 is slidably provided in a central bore 1' of the valve casing to control liquid flow through outlet ports 3,3. Partitioned by peripherally-sealed base plates 10,10 at the opposite ends of the valve casing are linear motors A,A, each consisting of a stator 5 comprising a solenoid coil for producing a shifting magnetic field acting on an operation or armature rod 6 coaxially positioned in the stator and reciprocably moved by action of shifting magnetic field. Springs 7 are provided between the base plates 10 and spool 4 to orient the operation rod 6 and spool valve 4 in the position shown.

When deenergized, the large diametered portion or cylindrical lands 3' of the spool 4 are normally in a position to close the liquid outlet port 3.

The second embodiment shown in FIG. 2 is substantially the same as the first embodiment except the configuration of the valve spool 4'. The spool has a conical control area 4'' at one end and the other end is bell-like shape at the other end 4'''; the variable diametered portion 4'' sweeps outlet 3a affords finite control, and only one outlet port 3a is provided.

As shown diagrammatically in FIG. 3, the stator 5 of the linear motor A is connected to a variable current controller 8 which functions to vary voltage or frequency and thus energization of stator 5 (through current control) can vary speed of operation.

The fourth embodiment shown in FIG. 4 is substantially the same as FIG. 2 except for the shape of operation rod 6'. This operation rod 6' has a narrowed intermediate neck 6'' and an enlarged end portion 6a.

In the fifth embodiment, oepration rod 6b is provided with a magnetic-impermeable layer 9 having a varied cross sectional diameter.

OPERATION

In the embodiment shown in FIG. 1, when the stator 5 in the right side of linear motor A is energized and produces a magnetic field shifting to the left the operation rod 6, affected by the magnetic field, moves to the left. In turn, the spool 4 connected to the operation rod 6 moves axially so that its large diametered portion 3' is moved past the liquid left outlet port 3 and liquid discharges from the uncovered ports. If stator 5 is made longer, the operation stroke of the spool 4 can be longer. On the contrary, when the left side linear motor A is energized, spool 4 is moved to the right to close the liquid outlet port 3. Thus liquid flow can be controlled with the opening and closing of the valve controlled ports.

In the embodiment shown in FIG. 2, the spool 4' is moved laterally or axially in the same manner as in the embodiment of FIG. 1 to open or close the single liquid outlet port 3a. In this instance, the cross sectional area of the annular liquid passage formed by the inside wall of the valve and inclined face of spool varies as the cone of spool 4' moves whereby the quantity of liquid flow may be controlled.

In the embodiment shown in FIG. 3, when voltage or frequency of electric current supplied to the stator 5 is varied by means of the controller 8, the velocity or speed of magnetic field produced in the stator is varied, and, in turn, the operating velocity of the operating rod and valve spool are controlled.

In the operation rod 6' is made to have a smaller diameter portion or larger diameter portion as shown in FIG. 4, or if the diameter is covered with a magnetic-impermeable layer 9, the effective diameter of the operation rod 6' is varied; the magnetic sensibility or response of the operation rod is partially varied or changed so that the velocity of the spool 4' is varied and in this manner the liquid flow rate may be controlled by the spool valve.

What is claimed is:

1. A valve assembly comprising in combination: a valve casing having an axial bore,
   fluid inlet and outlet ports spaced along said axial bore
   and communicating therewith; linear motor means at least at one end of said valve casing; a valve spool reciprocably disposed in said axial bore and including a control land reciprocable relative to said ports for controlling fluid-flow therethrough,
   said linear motor means comprising an electromagnetic assembly including a stator and armature,
   said stator including means for producing a magnetic field shiftable in a linear direction when an electric current is applied thereto,
   said armature comprising an axial rod operatively connected to said valve spool and subject to shifting axially when subject to said stator whereby the valve spool land is shifted relative to said outlet port, said axial rod including a transverse cross section differing from that of adjacent portions whereby the magnetic reaction to the magnetic field can be altered in relation to response parameters of the valve spool.

2. The valve assembly as set forth in claim 1 in which said linear motor means is sealed from the valve element and inlet and outlet ports.

3. The valve assembly as set forth in claim 1 including spring means acting on said valve spool and normally centering the same to prevent fluid-flow through said outlet port.

4. A valve assembly as set forth in claim 1 in which said valve spool includes a cylindrical land having a frusto-conical portion at one end thereof whereby the orienting of the frusto-conical portion relative to said outlet port controls the quantity of fluid flow through the outlet port.

5. A valve assembly as set forth in claim 1 including current control means operatively connected to said linear motor means for controlling the generated magnetic field and the linear speed of the valve spool.

6. The valve assembly as set forth in claim 1 in which linear motor means are provided at opposite ends of said valve casing.

7. The valve assembly as set forth in claim 6 in which the casing includes a pair of outlet ports flanking the inlet port, said valve spool including spaced, cylindrical lands controlling fluid flow through the spaced ports and balancing the effect of fluid pressure of the valve spool.

8. A valve assembly comprising in combination: a valve casing having an axial bore,
   fluid inlet and outlet ports spaced along said axial bore
   and communicating therewith; linear motor means at least at one end of said valve casing; a valve spool reciprocably disposed in said axial bore and including a control land reciprocable relative to said ports for controlling fluid-flow therethrough,
   linear motor means comprising an electromagnetic assembly including a stator and armature,
   said stator including means for producing a magnetic field shiftable in a linear direction when an electric current is applied thereto, said armature comprising an axial rod operatively connected to said valve spoon and subject to shifting axially when subject to said stator whereby the valve spool land is shifted relative to said port, port said axial rod including magnetic-impermeable layer for varying the reaction of the rod to a magnetic field to alter response characteristics of the valve spool.

* * * * *